3,346,512
PREPARATION OF A CRYSTALLINE ALUMINO-SILICATE ZEOLITE IN A SILICEOUS MATRIX

Elroy Merle Gladrow and Warren Maxwell Smith, Baton Rouge, La., assignors to Esso Research and Engineering Company, a corporation of Delaware
No Drawing. Filed Apr. 16, 1964, Ser. No. 360,429
14 Claims. (Cl. 252—455)

This invention relates to an improved process for preparing hydrocarbon conversion catalysts comprising synthetic crystalline alumino-silicate zeolites which are distributed throughout a siliceous matrix, the catalysts thereby produced, and their use in hydrocarbon conversion processes.

Crystalline alumino-silicate zeolites, commonly referred to as "molecular sieves," are well known in the art. They are characterized by their highly ordered crystalline structure and uniformly dimensioned pores, and are distinguishable from each other on the basis of composition, crystal structure, adsorption properties, and the like. The term "molecular sieves" is derived from the ability of these zeolite materials to selectively adsorb molecules on the basis of their size and form. The various types of molecular sieves may be classified according to the size of the molecules which will be rejected (i.e. not adsorbed) by a particular sieve. A number of these zeolite materials are described, for example, in U.S. Patent 3,013,982, wherein they are characterized by their composition and X-ray diffraction characteristics. In addition to their extensive use as adsorbents for hydrocarbon separation processes and the like, it has recently been found that crystalline alumino-silicate zeolites, particularly after cation exchange to reduce alkali metal oxide content, are valuable catalytic materials for various processes, particularly hydrocarbon conversion processes, e.g. catalytic cracking.

In general, the crystalline alumino-silicate zeolites within the purview of the present invention may be represented by the following formula, expressed in terms of moles:

$$0.9 \pm 0.2 M_{2/n}O : Al_2O_3 : X\ SiO_2$$

wherein M is selected from the group consisting of metal cations and hydrogen, $n$ is its valence, and X is a number from about 1.5 to about 12. The value of X will vary with the particular zeolite in question. Among the well-known natural zeolites are mordenite, faujasite, chabazite, gmelinite, analcite, erionite, etc. Such zeolites differ in structure, composition, and particularly in the ratio of silica to alumina contained in the crystal lattice structure; e.g. mordenite, having a ratio of about 8 to about 12; faujasite, having a ratio of about 2.5 to about 7; etc. Similarly, the various types of synthetic crystalline zeolites, e.g. faujasite, mordenite, etc., will also have varying silica to alumina ratios depending upon such variables as composition of crystallization mixture, reaction conditions, etc. U.S. Patents Nos. 3,013,982–3,013,986 describe a number of synthetic zeolites, designated therein as zeolites A, D, L, R, S, T, X and Y.

The processes for producing such crystalline synthetic zeolites are well known in the art. Typically, they involve crystallization from reaction mixtures containing: $Al_2O_3$ as sodium aluminate, alumina sol and the like; $SiO_2$ as sodium silicate and/or silica gel and/or silica sol; alkali metal oxide, e.g. sodium hydroxide, either free or in combination with the above components; and water. Careful control is kept over the alkali metal oxide concentration of the mixture, the proportions of silica to alumina and alkali metal oxide to silica, the crystallization period, etc., to obtain the desired product.

The zeolite which will be most preferred in the present invention is the synthetic faujasite variety, wherein X in the above formula is about 2.5 to 7, preferably 3 to 6, most preferably 4 to 5.5. It will usually have an average pore diameter of about 6 to 15, preferably 8 to 13, A. A conventional scheme for preparing synthetic sodium faujasite is as follows:

Colloidal silica or silica hydrosol is mixed with a solution of sodium hydroxide and sodium aluminate at ambient temperature. Suitable reactant molar ratios fall within the following ranges: $Na_2O/SiO_2$, 0.28 to 0.80; $SiO_2/Al_2O_3$, 4 to 40; $H_2O/Na_2O$, 15 to 60. The reaction mixture is preferably allowed to digest at ambient temperature for up to 40 hours or more, preferably 1 to 15 hours, or cooled to below about 80° F., in order to aid crystallization, and then heated to and held at about 180° to 250° F., e.g. 200° to 220° F., for a sufficient period to crystallize the product and to achieve maximum crystallinity, e.g. 24 to 200 hours or more, typically 50 to 100 hours. A crystalline hydrated sodium alumino-silicate zeolite having a faujasite structure is then separated from the aqueous mother liquor by decantation or filtration, washed, and dried to recover a crystalline product. It is then calcined at temperatures up to about 1000° F. in order to remove the water of hydration and thereby form interstitial channels which confer adsorptive and catalytic properties.

When these crystalline alumino-silicate zeolites are to be used as catalytic agents for hydrocarbon conversion processes, they must be subjected to cation exchange to reduce their alkali metal oxide (e.g. $Na_2O$) content to less than about 10 wt. percent, preferably less than about 6 wt. percent, since alkali metal oxides do not promote the desired hydrocarbon conversion reactions. Accordingly, the alkali metal oxide content is customarily reduced by ion exchange treatment with solutions of ammonium salts, or salts of metals in Groups I to VIII or the rare earth metals, preferably metals in Groups II, III, IV, V, VI–B, VII–B, VIII and rare earth metals. Specific examples of suitable metals include magnesium, calcium, boron, aluminum, yttrium, cerium, platinum, manganese, palladium and lanthanum. The alkaline earth metals will be preferred, with magnesium being particularly preferred. The ion exchange can be simply accomplished by slurrying the zeolite product with an aqueous solution of the desired cation at temperatures of about 60° to 180° F. to replace the alkali metal, and washing the resulting base-exchanged material free of soluble ion prior to drying. Suitable salt solutions include, for example, magnesium sulfate, calcium chloride, barium chloride, iron sulfate, ammonium hydroxide, ammonium chloride, etc. Magnesium ion has been found to be especially valuable in forming a superior cracking catalyst.

In connection with the use of crystalline zeolites as hydrocarbon conversion catalysts, it has been found that the extremely fine size crystals which are usually produced in their manufacture have generally proved unsuitable in moving or fluidized bed operations because of excessive carry-over losses. Additionally, these crystalline zeolites are frequently unsuitable for direct use as catalysts because of their extremely high activities which often lead to overconversion and undesirable product selectivity. Accordingly, it has recently been discovered that an improved form of crystalline alumino-silicate zeolite, which is suitable for moving or fluidized bed operations, and particularly for hydrocarbon conversion processes, can be produced by distributing the crystalline zeolite throughout a siliceous gel or cogel matrix. The terms "gel" and "cogel" as used herein are intended to include gelatinous precipitates, hydrosols, or hydrogels of silica and/or admixtures of silica and one or more oxides of metals selected from Groups II–A, III–A and IV–B of the Periodic Table, e.g. alumina, magnesia, zirconia, titania, etc. The silica content of the gel may range from about 55 to 100 wt. percent. The term "siliceous" as used herein is thus intended to include silica per se as well as silica in combination with one or more of the above metal oxides. Silica-alumina cogel is especially preferred. The resulting composite, which consists of crystalline zeolite distributed throughout a siliceous gel or cogel matrix, has been found to exhibit improved catalytic selectivity, stability and fluidization properties.

A relatively simple means of incorporating the crystalline alumino-silicate zeolite into the siliceous matrix is to add pre-formed zeolite crystals to a suitable hydrogel, such as a silica-alumina hydrogel, and homogenize the resulting mixture by passage through a blending apparatus, such as a colloid mill, ball mill, and the like. The homogenized slurry is then formed into particles of a size range desired for fluidized bed operations. This may be conveniently accomplished by any rapid drying technique, such as spray drying, although other methods may be employed. In copending application S.N. 222,925, two methods of preparing the composite zeolite-matrix catalyst are disclosed:

(a) The first method generally comprises forming a suitable hydrogel or gelatinous precipitate such as a silica-alumina hydrogel which, as prepared, contains impurities comprising sodium salts; adding the sodium form of the crystalline alumino-silicate zeolite to the hydrogel; and mixing and drying the mixture. After drying, the resulting zeolite-matrix composite is converted to a catalytic material by washing with water and then exchanging the composite with a suitable salt of the desired cation, such as magnesium sulfate. This method therefore involves the combination of impure unwashed hydrogel and sodium-form zeolite, subsequent mixing and drying, and final washing and base exchange of the composite.

(b) The second method involves initially washing the impure hydrogel so as to free it of soluble salts and then combining the washed silica-alumina hydrogel with the desired pre-exchanged form (e.g. Mg-form) of the zeolite, followed by mixing and drying. In this method, therefore, each ingredient (i.e. the zeolite and the matrix material) is separately pretreated to produce the desired forms, and then combined to form the zeolite-matrix composite material. This is distinguished from the first method (a) which involves treatment of the final composite to produce the desired washed and exchanged form.

The present invention provides an improved zeolite-matrix catalyst which is superior to that formed by either of the above methods disclosed in S.N. 222,925, now abandoned. Briefly, this method differs from the above methods by combining pre-exchanged zeolite with unwashed hydrogel. The present method of preparing the catalyst comprises the following steps:

(1) Preformed, pre-exchanged crystalline alumino-silicate zeolite is admixed with unwashed siliceous hydrogel, and the resulting mixture is spray dried. The zeolite and the siliceous hydrogel may be any one of the types hereinbefore described, with the preferred form of zeolite being the synthetic faujasite type and the preferred hydrogel being silica-alumina hydrogel. The zeolite is pre-exchanged by conventional ion-exchange methods with a solution of a metal salt of any of the metals hereinbefore described as being suitable for exchanging the zeolite. The preferred exchange metal will be magnesium, and preferably the extent of exchange will be sufficient to replace about 55 to 95%, preferably 65 to 88%, of the original alkali metal oxide (e.g. $Na_2O$) contained in the zeolite prior to exchange. Thus, this first step comprises admixing a crystalline zeolite, in which a substantial portion of the original soda in the zeolite has been replaced with one of the aforementioned metal cations, e.g. Mg, Ca, or the rare earth metal cations, with unwashed silica-alumina hydrogel, followed by spray drying of the admixture.

(2) The spray dried composite product is reslurried in water and treated with dilute ammonium sulfate solution to remove soluble sodium and sulfate ions from the gel matrix. About one to three treatments will be suitable. The pH of the ammonium sulfate solution will usually be about 4.5 to 5.5, and its concentration will usually be about 1 to 5 wt. percent. A ratio of about 2 to 10 grams of ammonium sulfate per gram of zeolite will be suitable. Optionally, the ammonium sulfate solution can also contain in solution a salt of the particular metal used to pre-exchange the zeolite. For example, if the pre-exchanged zeolite is in the magnesium form, a magnesium salt (e.g. $MgSO_4$) can also be included in the ammonium sulfate solution.

(3) Optionally, the catalyst may then be calcined for a short period of time, e.g. 0.1 to 3.0 hours, at 450 to 1000° F. A rotary tunnel dried may be used for this purpose.

(4) The composite catalyst is treated with a dilute metal cation solution corresponding to the metal cation used in the pre-exchange of the zeolite, e.g. magnesium sulfate solution will be suitable if the zeolite was pre-exchanged to the magnesium form. The concentration of this solution will generally be about 1 to 10 wt. percent, and will be utilized in a ratio of about 1 to 8 grams of salt per gram of zeolite. About one to three treatments will be suitable, although one treatment will usually suffice to replace any of the metal cation which may have been removed by base exchange with either the residual soda in the hydrogel or the ammonium ions remaining after step (2) above.

(5) The catalyst is finally washed thoroughly with water and dried at a temperature of 200 to 500° F. It is now ready for use as a hydrocarbon conversion catalyst.

The above-mentioned spray drying step comprises spraying the composite mixture through nozzles into a tower containing hot flowing gases at a temperature at the nozzles in the range of about 400 to 850° F. This spray drying procedure is desired because of the increased attrition resistance achieved due to the spherical nature of the particles obtained, as well as the excellent particle size distribution which is useful for fluidized bed processes, e.g. predominantly 20 to 100 micron average particle diameter. Thus, by means of this spray drying step, a highly porous solid is obtained having improved attrition resistance due to the spherical nature of the particles.

It will be readily understood that the present method of preparing the zeolite-siliceous matrix composite differs from the methods disclosed in copending application S.N. 222,925 in the use of the *pre-exchanged crystalline zeolite* and the impure, *unwashed hydrogel*, hydrosol, or gelatinous precipitate of silica, silica-alumina, silica-magnesia, silica-zirconia, etc. As will be hereinafter illustrated, the catalyst of the present invention has significantly higher catalystic activity than similar catalysts prepared by the prior methods which have comprised either the use of pre-exchanged crystalline zeolite composited with *washed* siliceous hydrogel, or the use of *unexchanged* crystalline zeolite composited with unwashed siliceous hydrogel.

The hydrogels useful in the present invention may be used as supplied commercially or may be separately prepared. For example, a silica-alumina hydrogel may be prepared by first producing a hydrous precipitate of silica by mixing a solution of sodium silicate with an acid, e.g. sulfuric acid, to produce a slurry having a pH below 7, usually below about 4; then adding a solution of an aluminum salt, e.g. aluminum sulfate; and adjusting the pH of the mixture to above about 4 by addition of alkaline material, e.g. ammonia, in order to precipitate the alumina. The amount of aluminum salt used will normally be that required to give a silica-alumina precipitate containing about 8 to 45 wt. percent, preferably 10 to 30 wt. percent, (dry basis) of $Al_2O_3$.

It is to be noted that the hydrogels formed by the above procedure, as well as those commercially available forms which are supplied in an "unwashed" state, contain a significant amount of sodium salt impurity. As previously indicated, such "unwashed" hydrogels are of the type to be used in the present invention. Upon combination of these unwashed hydrogels with the pre-exchanged (e.g. magnesium form) crystalline zeolites, superior catalytic compositions are formed. Additionally, with the final washing operation being performed on the zeolite-siliceous gel matrix composite material, any intermediate washing step is thereby obviated.

The final zeolite-siliceous gel matrix will generally contain about 2 to 30 wt. percent, preferably 4 to 20 wt. percent, of crystalline zeolite, depending upon the intended use of the final composite product. For catalytic cracking purposes, the final composite catalyst will typically contain about 4 to 12 wt. percent crystalline zeolite. The water content of the hydrogel or gelatinous precipitate before spray drying is adjusted to within the range of about 88 to 96 wt. percent, and the crystalline alumino-silicate zeolite is added in sufficient amount to produce the aforementioned compositions. The resulting slurry is mixed well and is then formed into fluidizable particles by spray drying.

The above-described catalyst may be employed to convert a wide variety of hydrocarbon feeds of various origins; for example, petroleum, various fractions therefrom, such as catalytic recycle stocks, gas oil, top crude, etc., shale oil, synthetic oils, etc. These feeds may contain appreciable quantities of impurities; e.g. oxygen, sulfur, nitrogen, and soluble metal compounds. Operating details for hydrocarbon conversion processes are well known in the art. Fluidized bed operation will be preferred. The feed stock is contacted with the catalyst at suitable temperatures, feed rates, pressures, etc., to thereby effect a substantial conversion to lower boiling materials, such as gasoline, middle distillate, etc. For catalytic cracking, suitable operating conditions will usually include a temperature of about 500 to 1200° F., preferably 750 to 1000° F.; a pressure of about 0 to 500 p.s.i.g., preferably 0 to 200 p.s.i.g.; and a space velocity of 0.2 to 20, preferably 1 to 10, volumes of feed per volume of catalyst per hour.

It is to be understood that the preferred catalyst composition of the present invention may be characterized as crystalline alumino-silicate particles suspended in and distributed throughout a matrix of amorphous, porous, silica-alumina. Thus, although the zeolite is partially or entirely enclosed or embedded in a non-zeolitic material, there is still provided sufficient means for access of molecules to and from the zeolite pore openings so as to provide the known attributes of crystalline alumino-silicate materials.

The invention will be more clearly understood by reference to the following examples which are not intended to be limiting.

EXAMPLE 1

*Part A.—Preparation of sodium form of crystalline alumino-silicate zeolite*

The sodium form of a crystalline alumino-silicate zeolite having a silica to alumina mole ratio of about 5.1 was prepared by the following typical procedure.

A solution of 30.0 kilograms of NaOH and 8.5 kilograms of sodium aluminate in 107.5 liters of water was added with stirring to 193.0 kilograms of low soda Ludox (30 wt. percent silica hydrosol supplied by E. I. du Pont de Nemours & Co.) contained in a 200 gallon steam jacketed vessel. Mixing was conducted at ambient temperatures. Stirring was continued until the mixture was homogeneous. The mixture was then heated to 210° to 215° F. and maintained at said temperature for 5½ days to effect crystallization. The crystals were removed from the liquor by filtration and water washed until the wash water showed a pH of 9.0 to 9.5. On drying, the crystalline alumino-silicate analyzed 13.9% $Na_2O$, 64.0% $SiO_2$, and 21.2% $Al_2O_3$. On a mole basis, this corresponds to: 1.08 $Na_2O$:1.0 $Al_2O_3$:5.1 $SiO_2$. The zeolite exhibited a typical faujasite structure as determined by X-ray analysis.

*Part B.—Preparation of magnesium form of crystalline alumino-silicate zeolite*

The above sodium form of crystalline alumino-silicate zeolite was converted to the magnesium form by the following procedure.

Twenty kilograms of the dried sodium-zeolite were added to 50 gallons of a 6% by weight solution of $MgSO_4$. The slurry was stirred at ambient temperatures (70° to 80° F.) for 3 hours. Stirring was stopped, the solids were allowed to settle, and the supernatant liquor was removed by decantation. This exchange procedure was repeated two more times using fresh 6% $MgSO_4$ solutions each time. The solids were finally water washed until the wash water gave a negative test for sulfates with barium chloride. On analysis the zeolite contained 5% MgO and 3.85% $Na_2O$.

*Part C.—Preparation of prior art catalysts and catalysts of the present invention*

The above sodium form and magnesium form of the crystalline alumino-silicate zeolite were modified by the formation of a composite of zeolite and siliceous matrix in accordance with the following procedures:

(1) Catalyst A was prepared by admixing the above magnesium-form zeolite with a slurry of washed silica-alumina hydrogel, followed by spray drying of the admixture.

The washed silica-alumina hydrogel was obtained from a commercial supplier. It is believed to have been made by first pumping $CO_2$ into a sodium silicate solution (specific gravity about 1.1) to reduce the pH and effect gelation to silica hydrosol. After a suitable aging period to establish gel structure the hydrosol is blended with a stream of dilute sulfuric acid and alumina hydrate to lower the composite gel pH to around 5.0. The combined $SiO_2+Al_2O_3$ content of the composite hydrogel is about 6 wt. percent. The silica-alumina comprises 13% $Al_2O_3$. This mixture contains considerable residual soluble salts such as sodium sulfate, sodium carbonate, and sodium silicate. The mixture is then filtered on a rotary drum string filter, which reduces the water content and soluble salt content of the hydrogel by about 50%. The product is reslurried in decationized water to about the original 6 wt. percent $(SiO_2+Al_2O_3)$ content, and the filtration operation is repeated. This washing procedure is repeated until the residual soda content has been reduced to about 0.04% (on a dry solids basis).

The washed, dewatered, hydrous precipitate of silica-alumina (containing about 88% water) as received from the manufacturer was slurried in an equal weight of water, and the magnesium-exchanged zeolite was added in sufficient amount to produce a 5 wt. percent zeolite in the finished composite catalyst. The composite slurry was then mixed well, spray dried at about 600° F., and finally calcined for 16 hours at 1000° F. to produce a finished composite catalyst containing 5 wt. percent zeolite and 95 wt. percent silica-alumina.

(2) Catalyst B was prepared by slurrying the above-described sodium form of the crystalline zeolite in an unwashed silica-alumina hydrogel (containing 13 wt. percent alumina), which hydrogel was prepared by the above-described procedure except that the final washing steps to remove residual soluble salts were eliminated. After mixing and spray drying at about 600° F., the composite material was washed thoroughly in water, filtered, and then slurried in a 5 wt. percent ammonium sulfate solution using about 10 equivalents of ammonium ion per equivalent of sodium ion in the zeolite. After one hour, the supernatant liquid was decanted, the composite was again washed thoroughly with water and the wash water decanted. The liquid volume was then restored to its original level with water. Into this aqueous slurry there was dissolved sufficient magnesium nitrate to produce a 5 wt. percent solution, using about 8 equivalents of magnesium ion per equivalent of sodium and/or ammonium ion in the zeolite. After stirring for about 1 hour, the supernatant liquid was decanted, the catalyst was again thoroughly washed with water and finally filtered with a suction filter. This exchange treatment with magnesium nitrate was repeated for an additional three times before final washing, filtering, and oven drying at 225° F. The final catalyst contained 5 wt. percent magnesium-form zeolite embedded in 95 wt. percent silica-alumina (13% alumina).

(3) Catalyst C was prepared by slurrying the above-described magnesium form of the zeolite in an unwashed 87% $SiO_2$-13% $Al_2O_3$ hydrogel which was prepared by a procedure similar to that described in (2) above. Specifically, 110 lbs. of the unwashed hydrogel (11.3 wt. percent solids) were mixed with 110 lbs. $H_2O$ and colloid milled to produce a fluid hydrosol. In a separate vessel, 0.66 lbs. of the preformed magnesium faujasite were slurried in 1 gallon $H_2O$ and colloid milled to give a milky suspension of zeolite. The unwashed silica-alumina hydrosol and the zeolite suspension were composited and homogenized. The mixture was spray dried at about 600° F. The product was slurried in 50 lbs. hot (160° F.) $H_2O$ for 15 minutes and filtered. The filter cake was then slurried in 50 lbs. of hot 2% $(NH_4)_2SO_4$ for 15 minutes and filtered. Finally, the cake was slurried in 50 lbs. of hot 2% $MgSO_4$ solution for 15 minutes, filtered with suction, rinsed well with water to remove residual sulfate ions, and dried. The final catalyst comprised 5 wt. percent magnesium form faujasite and 95% by weight of 87% $SiO_2$-13% $Al_2O_3$ gel and exemplifies the catalysts of the present invention.

(4) Catalyst D was prepared by slurrying the above-described magnesium form of the zeolite in an unwashed silica-alumina hydrogel containing 25 wt. percent alumina which was prepared by a procedure similar to that described above. After mixing and spray drying at about 600° F., the product was slurried in a 1.2 wt. percent ammonium carbonate solution in an amount sufficient to yield 13.5 equivalents of ammonium ion per equivalent of sodium ion in the zeolite. After stirring for 1 hour, the slurry was filtered, washed with water, and the ammonium-exchange treatment was repeated with fresh ammonium carbonate solution, filtered, and rinsed on the filter. The filter cake was then reslurried in fresh magnesium nitrate solution containing 1.4 wt. percent salt. The amount of magnesium nitrate solution used provided 10 equivalents of magnesium ions per sodium and ammonium ion in the zeolite. After stirring for about 1 hour, the catalyst was filtered, thoroughly washed with water, and dried. The final catalyst comprised 5 wt. percent magnesium from zeolite embedded in 95 wt. percent of 75% $SiO_2$-25% $Al_2O_3$ gel and exemplifies the catalysts of the present invention.

(5) Catalyst E was a conventional commercially supplied silica-alumina gel type cracking catalyst containing 25 wt. percent alumina.

EXAMPLE 2.—CATALYTIC CRACKING

Catalysts A, B, D, and E of Example 1 were initially calcined at 1000° F. and then steamed at 1400° F. and 0 p.s.i.g. pressure for 16 hours. They were then tested in a batchwise fluidized bed type cracking operation. The feed stock was a gas oil having a boiling range of 600–800° F., a sulfur content of 1.14 wt. percent, and a gravity of 26.9° API. The tests were conducted at atmospheric pressure and 960° F., using a 3-minute cycle time. The results of these tests with the four catalysts are summarized in Table I, wherein the term "Relative Activity" is the ratio of feed rates required by the catalyst in question to the standard catalyst E to provide the same level of conversion.

TABLE I.—CATALYTIC CRACKING OF 600–800° F. VIRGIN GAS OIL

[Temperature, 960° F.; pressure, atm.; cycle time, 3 min.]

| Catalyst | A | B | D | E |
|---|---|---|---|---|
| Catalyst description and preparation | Preformed Mg-zeolite embedded in washed 87% silica-13% alumina hydrogel; spray dried | Na-zeolite embedded in unwashed 87% silica-13% alumina hydrogel; spray dried; washed; ammonium exchanged; magnesium exchanged; washed and dried | Preformed Mg-zeolite embedded in unwashed 75% silica-25% alumina hydrogel; spray dried; ammonium exchanged; magnesium exchanged; washed and dried | 100% silica-alumina [1] gel (75% $SiO_2$-25% $Al_2O_3$) |
| Conversion to 430° F.-, wt. percent | 77 | 77 | 77 | 77 |
| Relative activity [2] | 1.0 | 1.0 | 2.2 | 1.0 |
| Carbon, wt. percent | 5.2 | 5.2 | 7.1 | 8.2 |
| $C_3$—dry gas, wt. percent | 14 | 14 | 10 | 15 |
| $C_5$+naphtha, wt. percent | 45.5 | 45.5 | 50 | 39 |

[1] Commercially available 25% $Al_2O_3$-75% $SiO_2$ catalyst.
[2] Ratio of feed rates required to produce same conversion as standard silica-alumina catalyst E.

As shown in the above table, the catalyst of the present invention, Catalyst D, demonstrated a higher activity than either Catalyst A or Catalyst B, which were prepared by similar prior art procedures. Catalyst D had more than twice the activity of either the prior art catalysts or the conventional cracking catalyst, Catalyst E. The catalyst of the invention is shown to be substantially superior for catalytic cracking to desired naphtha product. It is to be noted that, in this example, the silica and alumina contents of the hydrogel matrix in Catalyst D was the same as that of the standard comparison Catalyst E.

EXAMPLE 3.—CATALYTIC CRACKING

Catalysts A, B, C and E of Example 1 were initially calcined at 1000° F. and then steamed at 1400° F. and 0 p.s.i.g. pressure for 16 hours. They were then tested in a batchwise fluidized bed type cracking operation. The feed stock was a gas oil having a boiling range of 550–675° F., a sulfur content of 0.20 wt. percent, and a gravity of 33.3° API. The tests were conducted at 950° F. and atmospheric pressure, using a 2-minute cycle time. The results of these tests with the four catalysts are summarized in Table II, which indicates the activity and yields obtained with each of the catalysts tested relative to those obtained with the standard Catalyst E.

TABLE II.—CATALYTIC CRACKING OF 550–675° F. VIRGIN GAS OIL

[Temperature, 950° F.; pressure, atm.; cycle time, 2 min.]

| Catalyst | A | B | C | E |
|---|---|---|---|---|
| Catalyst description and preparation | Preformed Mg-zeolite embedded in washed 87% silica–13% alumina hydrogel; spray dried | Na-zeolite embedded in unwashed 87% silica–13% alumina hydrogel; spray dried; washed; ammonium exchanged; magnesium exchanged; washed and dried | Preformed Mg-zeolite embedded in unwashed 87% silica–13% alumina hydrogel; spray dried; ammonium exchanged; magnesium exchanged; washed and dried | 100% silica-alumina [1] gel (75% $SiO_2$–25% $Al_2O_3$) |
| Conversion to 430° F.⁻, wt. percent | 60 | 60 | 60 | 60 |
| Relative activity [2] | 2.0 | 1.6 | 2.5 | 1.0 |
| Relative carbon,[3] wt. percent | 0.3 | 0.3 | 0.3 | 1.0 |
| Relative $C_3^-$ dry gas [3] | 0.6 | 0.6 | 0.5 | 1.0 |
| Relative $C_4$ (total) [3] | 0.8 | 0.8 | 0.8 | 1.0 |
| Relative $C_5^+$ naphtha [3] | 1.3 | 1.3 | 1.4 | 1.0 |

[1] Commercially available 25% $Al_2O_3$–75% $SiO_2$ catalyst.
[2] Ratio of feed rates required to produce same conversion as standard silica-alumina Catalyst E.
[3] Wt. ratio of yield obtained with catalyst tested to yield obtained with standard Catalyst E at 60% conversion.

As shown in Table II, the catalyst of the present invention, Catalyst C, demonstrated a higher activity than either Catalyst A or Catalyst B which were prepared by similar prior art procedures. In this example the silica and alumina contents of the hydrogel matrix in Catalyst C was the same as that in the prior art Catalysts A and B. Selectivity of the Catalyst C to $C_5$—430° F. gasoline is also shown to be improved.

What is claimed is:

1. An improved catalyst composition comprising a metal-containing, essentially hydrogen-containing cation free, crystalline alumino-silicate zeolite having a uniform pore diameter of between about 6 and 15 A. embedded in a siliceous gel matrix, said zeolite having been base-exchanged with a cation selected from the group consisting of cations of metals in Groups II, III, IV, V, VI–B, VII–B, VIII and the rare earth metals, wherein said catalyst composition has been prepared by a process comprising (1) admixing said metal-containing zeolite with a slurry of an unwashed siliceous hydrogel selected from the group consisting of silica gel, cogels of silica and at least one other metal oxide selected from the group consisting of oxides of metals in Groups II–A, III–A, and IV–B of the Periodic Table, and mixtures thereof; (2) spray drying the resulting admixture to form a composite material comprising said zeolite embedded in siliceous matrix; (3) contacting said composite with ammonium ions; and (4) contacting said composite with metal cations of the same species used in said base exchange so as to essentially replace ammonium cations present in said zeolite by virtue of step (3).

2. The composition of claim 1, wherein said zeolite has been base-exchanged with alkaline earth metal cations prior to step (1).

3. The composition of claim 2, wherein said alkaline earth metal is magnesium.

4. The composition of claim 1, wherein said siliceous hydrogel is silica-alumina hydrogel.

5. The composition of claim 1, wherein said zeolite contains less than about 10 wt. percent alkali metal oxide.

6. The composition of claim 5, wherein said zeolite is a synthetic faujasite having a silica to alumina mole ratio of about 2.5 to 7.

7. The composition of claim 6, which contains 2 to 30 wt. percent of said zeolite.

8. An improved process for preparing a catalyst composition comprising a metal-containing, essentially hydrogen-containing cation free, crystalline alumino-silicate zeolite embedded in a siliceous gel matrix, said zeolite having been base-exchanged with a cation of a metal selected from the group consisting of metals in Groups II, III, IV, V, VI–B, VII–B, VIII, and the rare earth metals; said siliceous gel being selected from the group consisting of silica gel, cogels of silica and at least one other metal oxide selected from the group consisting of oxides of metals in Groups II–A, III–A, and IV–B of the Periodic Table, and mixtures thereof; which process comprises (1) admixing said metal-containing zeolite with a slurry of an unwashed siliceous hydrogel of the siliceous material desired in said matrix, (2) spray drying said admixture, (3) contacting said composite with ammonium ions, and (4) contacting said composite with metal cations of the same metal used in said base exchange so as to essentially replace ammonium cations present in said zeolite by virtue of step (3).

9. The process of claim 8, wherein said zeolite has a silica to alumina mole ratio of about 2.5 to 7.

10. The process of claim 8, wherein said zeolite is a synthetic faujasite having a silica to alumina mole ratio of 3 to 6.

11. The process of claim 8, wherein said zeolite has been base exchanged with alkaline earth metal cations prior to step (1) and wherein the alkali metal oxide content of said zeolite is less than 10 wt. percent.

12. The process of claim 11, wherein said alkaline earth metal is magnesium.

13. The process of claim 8, wherein said zeolite is added in an amount sufficient to produce 2 to 30 wt. percent zeolite in said catalyst composition.

14. An improved process for preparing a catalyst composition consisting essentially of the magnesium form of crystalline alumino-silicate zeolite embedded in a silica-alumina matrix, said zeolite having a uniform pore diameter of between about 6 and 15 A. and a silica to alumina mole ratio of about 2.5 to 7, and containing less than about 10 wt. percent $Na_2O$; which process comprises admixing said magnesium-form zeolite with an aqueous slurry of unwashed silica-alumina hydrogel in an amount sufficient to produce 2 to 30 wt. percent zeolite in said composite upon removal of water, spray drying the admixture to form a composite material comprising said zeolite embedded in said matrix, water washing said composite material, contacting said composite material with ammonium ion solution, contacting said composite material with magnesium ion solution so as to substantially replace any ammonium ions present in said zeolite by virtue of the ammonium ion contact, and water washing and drying said composite material.

References Cited

UNITED STATES PATENTS 3,157,591 11/1964 De Feo et al. _____ 208—120
3,210,267 10/1965 Plank et al. _____ 208—120
3,236,761 2/1966 Rabo et al. _____ 208—111

DELBERT E. GANTZ, *Primary Examiner.*

A. RIMENS, *Assistant Examiner.*